(12) United States Patent
Shingai et al.

(10) Patent No.: US 7,485,356 B2
(45) Date of Patent: Feb. 3, 2009

(54) OPTICAL RECORDING MEDIUM

(75) Inventors: Hiroshi Shingai, Tokyo (JP); Hiroshi Chihara, Tokyo (JP); Hideki Hirata, Tokyo (JP); Hideaki Miura, Tokyo (JP)

(73) Assignee: TDK Corporation, Tokyo (JP)

( * ) Notice: Subject to any disclaimer, the term of this patent is extended or adjusted under 35 U.S.C. 154(b) by 486 days.

(21) Appl. No.: 11/181,886

(22) Filed: Jul. 15, 2005

(65) Prior Publication Data

US 2006/0018241 A1 Jan. 26, 2006

(30) Foreign Application Priority Data

Jul. 15, 2004 (JP) .......................... P. 2004-208047
Jul. 15, 2004 (JP) .......................... P. 2004-208048
Jul. 15, 2004 (JP) .......................... P. 2004-208049

(51) Int. Cl.
*B32B 3/02* (2006.01)

(52) U.S. Cl. .................... 428/64.4; 428/64.5; 428/64.6; 430/270.13

(58) Field of Classification Search ................ 428/64.4, 428/64.5, 64.6; 430/270.13
See application file for complete search history.

(56) References Cited

U.S. PATENT DOCUMENTS

| | | | |
|---|---|---|---|
| 7,081,289 B2 * | 7/2006 | Ohno et al. | 428/64.1 |
| 2003/0224292 A1 * | 12/2003 | Shingai et al. | 430/270.12 |
| 2006/0013987 A1 * | 1/2006 | Yoshinari et al. | 428/64.1 |
| 2006/0068152 A1 * | 3/2006 | Shingai et al. | 428/64.4 |
| 2006/0078708 A1 * | 4/2006 | Shingai et al. | 428/64.4 |
| 2007/0025192 A1 * | 2/2007 | Shingai | 369/1 |

FOREIGN PATENT DOCUMENTS

| | | |
|---|---|---|
| CN | 1463000 A | 12/2003 |
| EP | 1 369 860 A2 | 12/2003 |
| EP | 1369860 A2 * | 12/2003 |
| EP | 1566800 A1 * | 8/2005 |
| JP | 63-167440 | 7/1988 |
| JP | 10-326436 | 12/1998 |
| JP | 2003-112477 | 4/2003 |
| JP | 2003-200665 | 7/2003 |
| JP | 2003-335065 | 11/2003 |
| JP | 2003-341240 | 12/2003 |

(Continued)

OTHER PUBLICATIONS

Takashi Kikukawa, et al., "Data Reliability Deterioration of Phase-Change Discs Caused by Lowering of Crystallization Speed of Amorphous Marks through a High Environmental Temperature Storage", Jpn. J. Appl. Phys., vol. 41, part 1, No. 5A, May 2002, pp. 3020-3024.

(Continued)

*Primary Examiner*—Elizabeth Mulvaney
(74) *Attorney, Agent, or Firm*—Oblon, Spivak, McClelland, Maier & Neustadt, P.C.

(57) ABSTRACT

An optical recording medium includes an information layer having a recording film. The recording film contains Sb of 79 atomic % to 95 atomic % and Ge of 5 atomic % to 21 atomic % as main components, and is formed of a phase change material which does not contain the elements in the sixteenth group of the periodic table.

17 Claims, 6 Drawing Sheets

FOREIGN PATENT DOCUMENTS

| | | |
|---|---|---|
| JP | 2004-25801 | 1/2004 |
| JP | 2004-122768 | 4/2004 |
| JP | 2004-195742 | 7/2004 |
| JP | 2004-224041 | 8/2004 |
| JP | 2006-027034 | 2/2006 |

OTHER PUBLICATIONS

Noboru Yamada, et al., "Phase Change Material for Use in Rewritable Dual-Layer Optical Disk Utilizing a Blue-violet Laser", Optical Data Storage Topical Meeting 2001, Apr. 2001, pp. 22-24.

* cited by examiner he present invention relates to an optical recording
OPTICAL RECORDING MEDIUM

BACKGROUND OF THE INVENTION

The present invention relates to an optical recording medium, and more specifically, to an optical recording medium which allows data recorded in a recording film included in an information layer of the optical recording medium to be directly overwritten with new data as desired even when the data is kept for a long time.

As recording media for recording digital data in the related art, optical recording media such as CDs (Compact Disks) or DVDs (Digital Versatile Disks) have been widely used.

Among methods of recording data in the optical recording media, a recording method of modulating data to be recorded by a predetermined length as recording marks formed along tracks provided in the optical recording media is typically employed. For example, in a DVD-RW as an example of the optical recording medium allowing data to be rewritten by a user, recording marks of a length corresponding to values from 3T to 11T and 14T ("T" denotes one clock period) are used, and the recording marks are formed in a recording film included in an information layer along tracks provided in an optical recording medium so that data are recorded.

By doing so, when the recording marks are formed in the recording film included in the information layer of the data-rewritable optical recording medium to record data, a laser beam is irradiated on the recording film included in the information layer along the tracks provided in the optical recording medium, and a phase change material in a crystalline state contained in the recording film becomes amorphous, so that amorphous regions having a predetermined length is formed in the recording film included in the information layer, thereby using the formed amorphous region as the recording marks.

That is, when data are recorded in the recording film included in the information layer of the data-rewritable optical recording medium, a laser beam whose power is set to a recording power Pw having a sufficiently high level is irradiated on the recording film included in the information layer, and a region of the recording film where the laser beam is irradiated is heated to a temperature higher than the melting point of a phase change material and then melted. Subsequently, a laser beam whose power is set to a base power having a sufficiently low level is irradiated on the recording film included in the information layer, and a region of the melted recording film is rapidly cooled down. Consequently, the phase change material contained in the region of the recording film is changed from its crystalline state to an amorphous state, and the recording mark is formed in the recording film included in the information layer, so that data are recorded.

In the meantime, when the recording marks formed in the recording film included in the information layer of the data-rewritable optical recording medium are erased to erase data recorded in the recording film, a laser beam whose power is set to an erasing power Pe exceeding a base power Pb is irradiated on the recording film included in the information layer, regions where the recording marks of the recording film are heated to a temperature not less than the crystallizing temperature of a phase change material, and the regions where the recording film is heated are then slowly cooled down. Consequently, the phase change material contained in the regions of the recording film where the recording marks are formed is changed from its amorphous state to a crystalline state, and the recording marks are erased, thereby erasing the data.

Accordingly, by modulating the power of a laser beam irradiated on the recording film included in the information layer of the rewritable optical recording medium to a plurality of levels corresponding to the recording power Pw, the base power Pb, and the erasing power Pe, it is possible to directly overwrite data already recorded in the recording film with new data while erasing the recording marks formed in the recording film to form new recording marks as well as to form recording marks in the recording film included in the information layer to record data.

By doing so, when the data already recorded in the recording film included in the information layer of the rewritable optical recording medium is directly overwritten with new data, the phase change material in the amorphous state forming the recording marks is preferably crystallized to decrease the time required to erase the recording marks, and the recording film included in the information layer of the rewritable optical recording medium is usually formed of the phase change material having a high crystallization rate. By way of an example, a phase change material having an eutectic composition of $Sb_{70}Te_{30}$ is known as the phase change material having a high crystallization rate (See Patent Document 1).

[Patent Document 1] JP-A No.10-326436

However, when data are recorded in the optical recording medium including an information layer having a recording film formed of a phase change material and this optical recording medium is kept for a long time, it is difficult to crystallize the amorphized phase change material, which is known in the related art (For example, see T. Kikukawa, et. al., Jpn. J. Appl. Phys. Vol (41) 2002. pp 3020). Accordingly, it is difficult to erase the recording marks formed in the recording film as desired when data is directly overwritten with new data for the first time after an optical recording medium where the data is recorded is kept at a high temperature for a long time. Thus remaining recording marks not completely erased and newly formed recording marks are present together in the recording film after the already recorded data is directly overwritten with new data. As a result, jitter of reproduction signals degraded when the already recorded data is directly overwritten with new data to reproduce the recorded new data, and it is difficult to directly overwrite the data recorded in the recording film included in the information layer of the optical recording medium with new data as desired after the data is kept at a high temperature for a long time.

In addition, when the recording film formed of the phase change material is thinly formed, it is difficult to rapidly crystallize the amorphized phase change material, which is known in the related art (See N. Yamada, R. Kojima et. al., Technical Digest of ODS' 2001, p 22, 2001).

Accordingly, in an optical recording medium including an information layer having the thin recording film formed of the phase change material, it is very difficult to overwrite the data recorded in the recording film which is thinly formed with new data as desired after the data is kept at a high temperature for a long time.

However, in order to increase the recording capacity of the optical recording medium, an optical recording medium is proposed, which has a plurality of information layers each including a recording film formed of a phase change material, and data is recorded in the recording film included in an information layer farthest from a light incident plane among the information layers other than the information layer farthest from the light incident plane of a laser beam in such an optical recording medium, and when the data recorded in the recording film included in the information layer farthest from the light incident plane are reproduced, it is required to have a high optical transmittance to the laser beam so as to make the laser beam transmitted, so that the recording film included in the information layer needs to be made thin.

SUMMARY OF THE INVENTION

Accordingly, an object of the present invention is to provide an optical recording medium which allows data recorded in a recording film included in an information layer of the optical recording medium to be directly overwritten with new data as desired even when the data is kept at a high temperature for a long time.

Another object of the present invention is to provide an optical recording medium having a plurality of information layers laminated via at least a transparent intermediate layer on a supporting substrate, which allows the data recorded in the recording film included in at least one information layer among information layers other than the information layer farthest from a light incident plane of a laser beam among the plurality of information layers to be directly overwritten with new data as desired even when the data is kept at a high temperature for a long time.

The present inventor has vigorously repeated researches for accomplishing the objects of the invention and finally found out that when the recording film is formed of a phase change material which contains Sb of 79 atomic % to 95 atomic % and Ge of 5 atomic % to 21 atomic % as main components and does not contain the elements in the sixteenth group of the periodic table, the recording marks formed in the recording film can be rapidly and surely erased when the data recorded in the recording film included in the information layer of the optical recording medium is directly overwritten with new data for the first time after the data is kept at a high temperature for a long time. Accordingly, the jitter of reproduction signals can be prevented from being degraded when the data is directly overwritten with new data to reproduce the recorded new data.

The present invention is based on this knowledge, and the above objects of the present invention are achieved by an optical recording medium including an information layer having a recording film, and the recording film is formed of a phase change material which contains Sb of 79 atomic % to 95 atomic % and Ge of 5 atomic % to 21 atomic % as main components and does not contain the elements in the sixteenth group of the periodic table.

In the present invention, containing Sb and Ge as main components means that a total content of an Sb content and a Ge content is largest among elements forming the recording film included in the information layer of the optical recording medium.

According to the present invention, when the data recorded in the recording film included in the information layer of the optical recording medium is directly overwritten with new data for the first time after the data is kept at a high temperature for a long time, the jitter of reproduction signals can be effectively prevented from being degraded when the data is directly overwritten with new data to reproduce the recorded new data. As a result, it is possible to directly overwrite the data recorded in the recording film included in the information layer of the optical recording medium with new data as desired even when the data is kept at a high temperature for a long time.

When the recording film included in the information layer of the optical recording medium is formed of a phase change material which contains Sb of 79 atomic % to 95 atomic % and Ge of 5 atomic % to 21 atomic % as main components and does not contain the elements in the sixteenth group of the periodic table, the reason why the jitter of reproduction signals can be effectively prevented from being degraded when the data is directly overwritten with new data to reproduce the recorded new data is not necessarily obvious. However, it is considered that this is based on the fact that crystallization of the amorphized phase change material can be rapidly progressed to rapidly and surely erase the recording marks formed in the recording film even when the optical recording medium including the information layer having the recording film formed of this phase change material is kept at a high temperature for a long time.

In the present invention, the recording film included in the information layer of the optical recording medium is preferably formed of a phase change material which contains Sb of 81 atomic % to 90 atomic % and Ge of 10 atomic % to 19 atomic % as main components and does not contain the elements in the sixteenth group of the periodic table. When the recording film is formed of the phase change material which contains Sb of 81 atomic % to 90 atomic % and Ge of 10 atomic % to 19 atomic % as main components and does not contain the elements in the sixteenth group of the periodic table, the jitter of reproduction signals can be effectively prevented from being degraded when the data recorded in the recording film included in the information layer of the optical recording medium is directly overwritten with new data to reproduce the recorded new data after the data is kept at a high temperature for a long time.

In the present invention, the phase change material preferably contains Sb of 79 atomic % to 95 atomic % and Ge of 5 atomic % to 21 atomic % as main components, and it does not contain the elements in the sixteenth group of the periodic table, and it has an activation energy Ea of 4.0 eV to 6.5 eV. When the phase change material preferably contains Sb of 79 atomic % to 95 atomic % and Ge of 5 atomic % to 21 atomic % as main components and it does not contain the elements in the sixteenth group of the periodic table and it has the activation energy Ea of 4.0 eV to 6.5 eV, the phase change material can maintain a high crystallization rate and the recording marks formed in the recording film can have a high thermal stability while the recording film can be prevented from being crystallized in a case of keeping the optical recording medium when the recording film is formed of this phase change material. Accordingly, the data recorded in the recording film included in the information layer of the optical recording medium can be directly overwritten with new data as desired while the storage reliability of the optical recording medium can be enhanced even when the data is kept at a high temperature for a long time.

In the present invention, the phase change material more preferably contains Sb of 79 atomic % to 95 atomic % and Ge of 5 atomic % to 21 atomic % as main components, and it does not contain the elements in the sixteenth group of the periodic table, and it has an activation energy Ea of 4.0 eV to 5.5 eV.

In the present invention, the phase change material which contains Sb of 79 atomic % to 95 atomic % and Ge of 5 atomic % to 21 atomic % as main components and does not contain the elements in the sixteenth group of the periodic table may further contain elements other than Sb, Ge, and the elements in the sixteenth group of the periodic table.

In the present invention, when the recording film is formed of a phase change material which contains Sb of 79 atomic % to 95 atomic % and Ge of 5 atomic % to 21 atomic % as main components and does not contain the elements in the sixteenth group of the periodic table, it is possible to effectively prevent the jitter of reproduction signals from being degraded when the already recorded data is directly overwritten with new data to reproduce the recorded new data regardless of the thickness of the recording film. However, when the thickness of the recording film is 2 nm to 15 nm, in particular, when the thickness of the recording film is 4 nm to 9 nm, it is possible to more surely prevent the jitter of reproduction signals from being degraded when the already recorded data is directly overwritten with new data to reproduce the recorded new data. Accordingly, in the present invention, the recording film is preferably formed to have a thickness of 2 nm to 15 nm, and is more preferably formed to have a thickness of 4 nm to 9 nm.

In addition, the present inventor has found that the degree of distortion of a crystal lattice of the generated crystal has a correlation with easiness of crystallization of the phase change material when the phase change material forming the recording film is crystallized. Also the present inventor has found that when an index as a hexagonal lattice is given to the crystal generated by crystallizing the phase change material which is formed of a phase change material which contains Sb and Ge as main components and does not contain the elements in the sixteenth group of the periodic table in a case where the recording film is formed of the phase change material forming the crystal in an axis ratio (c/a) of the "c" axis length with respect to the "a" axis length in the hexagonal lattice is 2.670 to 2.715, the recording marks formed in the recording film can be rapidly and surely erased when the data recorded in the recording film included in the information layer of the optical recording medium is directly overwritten with new data for the first time after the data is kept at a high temperature for a long time. Accordingly, the jitter of reproduction signals can be prevented from being degraded when the data is directly overwritten with new data to reproduce the recorded new data.

According to the present invention, there is provided an optical recording medium which includes an information layer having a recording film formed of a phase change material containing Sb and Ge as main components and not containing the elements in the sixteenth group of the periodic table, and the phase change material forms a crystal having an axis ratio (c/a) of 2.670 to 2.715 of the "c" axis length with respect to the "a" axis length in a hexagonal lattice when an index as a hexagonal lattice is given to the crystal generated by crystallizing the phase change material.

In this case, the axis ratio (c/a) of the "c" axis length with respect to the "a" axis length in the hexagonal lattice is defined such that the recording film formed of the phase change material which contains Sb and Ge as main components and does not contain the elements in the sixteenth group of the periodic table is crystallized to measure an X-ray diffraction, and an index as the hexagonal lattice is given to the diffraction lines appearing in the obtained X-ray diffraction chart, and the "c" axis length (Å) and the "a" axis length (Å) in the hexagonal lattice are obtained according to an established rule based on these diffraction lines, respectively, and the obtained "c" axis length (Å) is divided by the "a" axis length (Å). In this case, the diffraction lines used for calculating the axis ratio of the "c" axis length with respect to the "a" axis length is not particularly limited as long as the "c" axis length (Å) and the "a" axis length (Å) can be obtained. However, in terms of the fact that they are present on the side of high angle and are close to each other, the diffraction lines originating from the hexagonal surface (104) appearing near an incident angle of 2θ=39° to 41° on the X-ray diffraction chart in the X ray diffraction using Cu-Kα rays, and the diffraction lines originating from the hexagonal surface (110) appearing near an incident angle of 2θ=41° to 43° on the X-ray diffraction chart in the X ray diffraction using Cu-Kα rays are preferably used.

When the recording film included in the information layer of the optical recording medium is formed of a phase change material which contains Sb and Ge as main components and does not contain the elements in the sixteenth group of the periodic table and forms a crystal having an axis ratio (c/a) of 2.670 to 2.715 of the "c" axis length with respect to the "a" axis length in a hexagonal lattice when an index as a hexagonal lattice is given to the crystal generated by crystallizing the phase change material, the reason why the jitter of reproduction signals can be effectively prevented from being degraded when the already recorded data is directly overwritten with new data to reproduce the recorded new data is not necessarily obvious. However, it is considered that this is based on the fact that crystallization of the amorphized phase change material can be rapidly progressed to rapidly and surely erase the recording marks formed in the recording film even when the optical recording medium including the information layer having the recording film formed of the phase change material is kept at a high temperature for a long time.

Further, the crystal having the axis ratio (c/a) of the "c" axis length with respect to the "a" axis length in the hexagonal lattice, that is, 2.690 to 2.715, is preferably formed. The jitter of reproduction signals can be more surely prevented from being degraded.

In addition, when the thickness of the recording film is 2 nm to 15 nm, in particular, when the thickness of the recording film is 4 nm to 9 nm, it is possible to more surely prevent the jitter of reproduction signals from being degraded when the already recorded data is directly overwritten with new data to reproduce the recorded new data. Accordingly, in the present invention, the recording film is preferably formed to have a thickness of 2 nm to 15 nm, and is more preferably formed to have a thickness of 4 nm to 9 nm.

Furthermore, the present inventor has found that when the optical recording medium includes a plurality of information layers, and when at least one of the information layers other than the information layer farthest from a light incident plane of a laser beam among the plurality of information layers includes a recording film formed of a phase change material which contains Sb of 79 atomic % to 95 atomic % and Ge of 5 atomic % to 21 atomic % as main components and does not contain the elements (O, S, Se, Te, and Po) in the sixteenth group in the periodic table, the recording marks formed in the recording film can be rapidly and surely erased even when the data recorded in the recording film included in the information layer of the optical recording medium is directly overwritten with new data for the first time after the data is kept at a high temperature for a long time. Therefore, the jitter of reproduction signals can be prevented from being degraded when the already recorded data is directly overwritten with new data to reproduce the recorded new data.

According to the present invention, there is provided an optical recording medium, which includes a plurality of information layers laminated via at least a transparent intermediate layer on a supporting substrate, and at least one of the information layers other than the information layer farthest from a light incident plane of a laser beam among the plurality of information layers includes a recording film formed of the above-described phase change material.

According to the present invention, it is possible to provide an optical recording medium which allows the data recorded in the recording film included in the information layer of the optical recording medium to be directly overwritten with new data as desired even when the data is kept at a high temperature for a long time.

DETAILED DESCRIPTION OF THE PREFERRED EMBODIMENTS

Hereinafter, preferred embodiments of the present invention will be described in detail with reference to the accompanying drawings.

Figure 1:
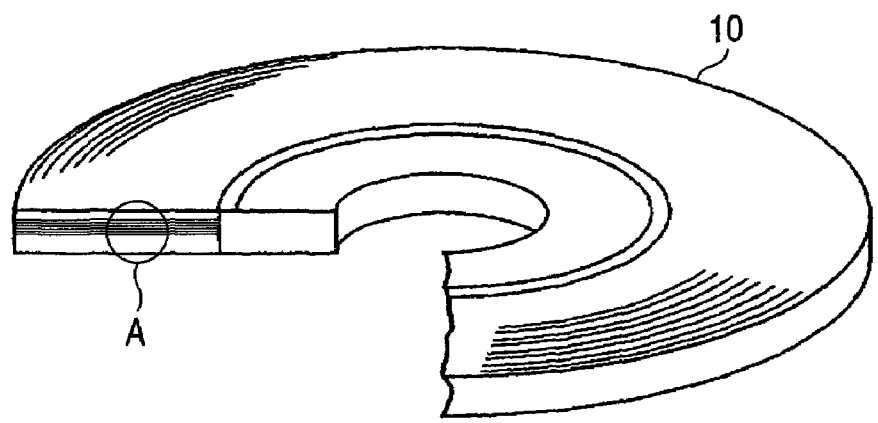
FIG. 1 is a partially cutaway schematic perspective view showing an optical recording medium in accordance with a preferred embodiment of the present invention.
Figure 2:
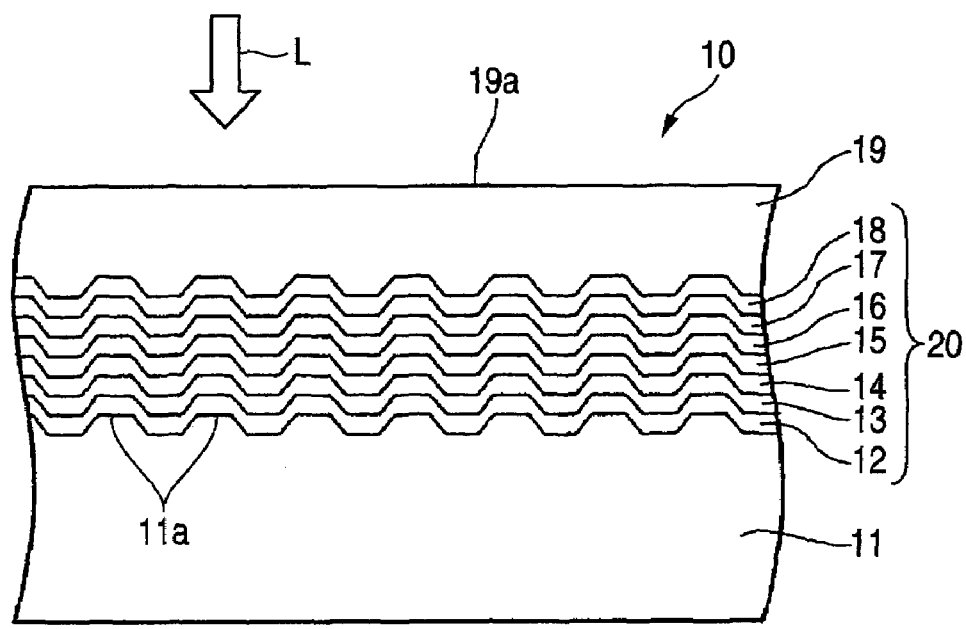
FIG. 2 is a schematically enlarged sectional view of a portion denoted by A in FIG. 1.

FIG. 1 is a partially cutaway schematic perspective view showing an optical recording medium in accordance with a preferred embodiment of the present invention, and FIG. 2 is a schematically enlarged sectional view of a portion denoted by A in FIG. 1.

As shown in FIG. 1, an optical recording medium 10 according to the present embodiment is formed in a disk shape, and has an outer diameter of about 120 mm and a thickness of about 1.2 mm.

The optical recording medium 10 of the present embodiment is configured as a rewritable optical recording medium, which includes a supporting substrate 11, a fourth dielectric film 12 formed on a surface of the supporting substrate 11, a reflective film 13 formed on a surface of the fourth dielectric film 12, a third dielectric film 14 formed on a surface of the reflective film 13, a recording film 15 formed on a surface of the third dielectric film 14, a second dielectric film 16 formed on a surface of the recording film 15, a first dielectric film 17 formed on a surface of the second dielectric film 16, a heat-radiating film 18 formed on a surface of the first dielectric film 17, and a light-transmitting layer 19 formed on a surface of the heat-radiating film 18 as shown in FIG. 2. In the present embodiment, the fourth dielectric film 12, the reflective film 13, the third dielectric film 14, the recording film 15, the second dielectric film 16, the first dielectric film 17, and the heat-radiating film 18 form an information layer 20.

Referring to FIG. 2, the optical recording medium 10 according to the present embodiment is configured such that a laser beam L having a wavelength of 380 nm to 450 nm is irradiated from a direction denoted by the arrow onto the light-transmitting layer 19 via an objective lens (not shown) having a numerical aperture NA satisfying $\lambda/NA \leq 640$, and data are recorded in the recording film 15 included in the information layer 20 of the optical recording medium 10, and the data are reproduced from the recording film 15 included in the information layer 20 of the optical recording medium 10, and a light incident plane 19a is formed by a surface of the light-transmitting layer 19.

The recording film 15 of the optical recording medium 10 according to the present embodiment is a layer for forming recording marks, and is formed of phase change materials, and is composed of a single film. Since the phase change material has a reflectance in its crystalline state different from a reflectance in its amorphous state, this difference between the reflectances is employed to make data recorded and make recorded data reproduced.

In the present embodiment, the recording film 15 is formed of a phase change material which contains Sb of 79 atomic % to 95 atomic % and Ge of 5 atomic % to 21 atomic % as main components and does not contain the elements in the sixteenth group of the periodic table. When the recording film 15 is formed of the phase change material, the recording marks formed in the recording film 15 can be rapidly and surely erased when the data recorded in the recording film 15 included in the information layer 20 of the optical recording medium 10 is directly overwritten with new data for the first time after the data is kept at a high temperature for a long time. Therefore, the jitter of reproduction signals can be effectively prevented from being degraded when the already recorded data is directly overwritten with new data to reproduce the new data. As a result, it is possible to directly overwrite the data recorded in the recording film 15 included in the information layer 20 of the optical recording medium with the new data as desired even when the data is kept at a high temperature for a long time.

The recording film 15 is preferably formed of a phase change material which contains Sb of 81 atomic % to 90 atomic % and Ge of 10 atomic % to 19 atomic % as main components and does not contain the elements in the sixteenth group of the periodic table. In this case, the jitter of reproduction signals when the data recorded in the recording film 15 included in the information layer 20 of the optical recording medium 10 is directly overwritten with new data to reproduce the recorded new data can be surely prevented from being degraded in a case where the already recorded data is directly overwritten with new data to reproduce the recorded new data for the first time after the data is kept at a high temperature for a long time.

In the present embodiment, the phase change material preferably contains Sb of 79 atomic % to 95 atomic % and Ge of 5 atomic % to 21 atomic % as main components, and it does not contain the elements in the sixteenth group of the periodic table, and it has an activation energy Ea of 4.0 eV to 6.5 eV. When the recording film 15 is formed of the phase change material, the data recorded in the recording film 15 included in the information layer 20 of the optical recording medium 10 can be directly overwritten with new data as desired while the storage reliability of the optical recording medium 10 can be enhanced even when the data are kept at a high temperature for a long time.

In the present embodiment, the phase change material more preferably contains Sb of 79 atomic % to 95 atomic % and Ge of 5 atomic % to 21 atomic % as main components, and it does not contain the elements in the sixteenth group of the periodic table, and it has an activation energy Ea of 4.0 eV to 5.5 eV.

Elements other than Sb, Ge, and the elements in the sixteenth group of the periodic table may be further added to the phase change materials for forming the recording film 15.

Accordingly, in the present embodiment, the recording film 15 is formed of the phase change material contains Sb of 79 atomic % to 95 atomic % and Ge of 5 atomic % to 21 atomic % as main components, and it does not contain the elements in the sixteenth group of the periodic table, and it has an activation energy Ea of 4.0 eV to 6.5 eV.

In the present embodiment, when the recording film 15 is formed of the phase change material which contains Sb of 79 atomic % to 95 atomic % and Ge of 5 atomic % to 21 atomic % as main components and does not contain the elements in the sixteenth group of the periodic table, it is possible to effectively prevent the jitter of reproduction signals from being degraded when the already recorded data is directly overwritten with new data to reproduce the recorded new data regardless of a thickness of the recording film 15. However, when the thickness of the recording film 15 is 2 nm to 15 nm, in particular, when the thickness of the recording film 15 is 4 nm to 9 nm, it is possible to more surely prevent the jitter of reproduction signals from being degraded when the already recorded data is directly overwritten with new data to reproduce the recorded new data. Accordingly, in the present embodiment, the recording film 15 is formed to a thickness of 2 nm to 15 nm.

The recording film 15 is formed of a phase change material which contains Sb and Ge as main components and dose not contain the elements in the sixteenth group of the periodic table, and forms a crystal having an axis ratio (c/a) of 2.670 to 2.715 of the "c" axis length with respect to the "a" axis length in a hexagonal lattice when an index as a hexagonal lattice is given to the crystal generated by crystallizing the phase change material.

Further, it is preferable to form the crystal having an axis ratio (c/a) of 2.690 to 2.715 of the "c" axis length with respect to the "a" axis length in a hexagonal lattice. In this case, the jitter of reproduction signals can be more surely prevented from being degraded.

Elements other than Sb, Ge, and the elements in the sixteenth group of the periodic table may be further added to the phase change material for forming the recording film 15.

Accordingly, in the present embodiment, the recording film 15 is formed of the phase change material, which contains Sb and Ge as main components and dose not contain the elements in the sixteenth group of the periodic table, and forms a crystal having an axis ratio (c/a) of 2.670 to 2.715 of the "c" axis length with respect to the "a" axis length in the hexagonal lattice when an index as a hexagonal lattice is given to the crystal generated by crystallizing the phase change material.

In the present embodiment, when the recording film 15 is formed of phase change materials which form the crystal in an axis ratio (c/a) of 2.670 to 2.715 of the "c" axis length with respect to the "a" axis length in the hexagonal lattice, it is possible to effectively prevent the jitter of reproduction signals from being degraded when the already recorded data is directly overwritten with new data to reproduce the recorded new data regardless of the thickness of the recording film 15. However, when the thickness of the recording film 15 is 2 nm to 15 nm, in particular, when the thickness of the recording film is 4 nm to 9 nm, it is possible to more surely prevent the jitter of reproduction signals from being degraded when the already recorded data is directly overwritten with new data to reproduce the recorded new data. Accordingly, in the present embodiment, the recording film 15 is formed to have a thickness of 2 nm to 15 nm.

The recording film 15 may be formed on a surface of the third dielectric film 14 by, for example, a vapor deposition method using chemical species containing constituent elements of the recording film 15. The vapor deposition method may include a vacuum deposition method, a sputtering method, and so forth, and the recording film 15 is preferably formed by the sputtering method.

The supporting substrate 11 acts as a supporting member for ensuring a mechanical strength required for the optical recording medium 10. The material for forming the supporting substrate 11 is not particularly limited as long as it can act as the supporting member of the optical recording medium 10, and a resin is preferably employed for the same. In particular, a polycarbonate resin, and a polyolefin resin are preferably employed as the resin in consideration of workability and optical characteristics, and the supporting substrate 11 is formed of the polycarbonate resin in the present embodiment.

In the present embodiment, the supporting substrate 11 has a thickness of about 1.1 mm.

In the present embodiment, since the laser beam L is irradiated onto the information layer 20 via the light-transmitting layer 19 positioned opposite to the supporting substrate 11, the supporting substrate 11 is not necessarily required to have an optical transparency.

Grooves 11a are formed on a surface of the supporting substrate 11. The grooves 11a formed on the surface of the supporting substrate 11 acts as guide tracks for the laser beam L when data are recorded in the recording film 15 included in the information layer 20.

The supporting substrate 11 having the grooves 11a on its surface is manufactured by, for example, injection molding using a stamper.

The fourth dielectric film 12, together with the reflective film 13 to be described below, acts to effectively radiate the heat generated in the recording film 15 by irradiation of a laser beam L. The material for forming the fourth dielectric film 12 is not particularly limited, and oxides, nitrides, sulfides, carbides, or fluorides, which contain at least one kind of metal selected from a group consisting of Ti, Zr, Hf, Ta, Si, Al, Mg, Y, Ce, and Zn, or compounds thereof are employed for the same. In the present embodiment, the fourth dielectric film 12 contains zirconium oxide having a crystal particle diameter of 20 nm or less as a main component and has a cubic crystalline structure. When the fourth dielectric film 12 contains zirconium oxide having a crystal particle diameter of 20 nm or less as a main component and has the cubic crystalline structure, the heat generated in the recording film 15 by irradiation of a laser beam L can be rapidly radiated.

The fourth dielectric film 12 is preferably formed to have a thickness of 3 nm to 15 nm. When the thickness of the fourth dielectric film 12 is less than 3 nm, an effect of radiating heat is degraded, and when the thickness of the fourth dielectric film 12 exceeds 15 nm, an internal stress occurring when the fourth dielectric film 12 is formed increases, so that cracks are apt to be caused in the fourth dielectric film 12.

The fourth dielectric film 12 is formed by, for example, a sputtering method, etc.

The reflective film 13 reflects the laser beam L irradiated onto the recording film 15 via the light-transmitting layer 19, and makes it exited from the light-transmitting layer 19 again, while effectively radiating the heat generated in the recording film 15 by irradiation of a laser beam L. The material for forming the reflective film is not particularly limited, but Mg, Al, Ti, Cr, Fe, Co, Ni, Cu, Zn, Ge, Ag, Pt, Nd, Au, and so forth are employed, and Al, Au, Ag, Cu, or alloys of Ag and Cu having a high reflectance among those elements, that is, a metal material of an alloy containing at least one metal among the metals is preferably employed to form the reflective film 13. In particular, when the reflective film 13 contains Ag, the reflective film 13 having a superior surface smoothness can be formed, and the noise level of reproduction signals can preferably decrease.

The thickness of the reflective film 13 is not particularly limited. However, 5 nm to 25 nm is preferable and 7 nm to 18 nm is more preferable.

The reflective film 13 is formed by, for example, a sputtering method, etc.

The third dielectric film 14, together with the second dielectric film 16, functions to effectively radiate the heat generated in the recording film 15 by irradiation of a laser beam L while physically and chemically protecting the recording film 15. The material for forming the third dielectric film 14 is not particularly limited, but the same material as the material for forming the fourth dielectric film 12 is used. In the present embodiment, the third dielectric film 14 contains zirconium oxide having a crystal particle diameter of 20 nm or less as a main component and has a cubic crystalline structure, similar to the fourth dielectric film 12. In this case, the third dielectric film can rapidly radiate the heat generated in the recording film 15 by irradiation of a laser beam L.

The third dielectric film 14 is preferably formed to have a thickness of 3 nm to 15 nm. When the thickness of the third dielectric film 14 is less than 3 nm, it is difficult to form the third dielectric film 14 as a continuous film, whereas when the thickness of the third dielectric film 14 exceeds 15 nm, an internal stress occurring when the third dielectric film 14 is formed increases, so that cracks are apt to be caused in the third dielectric film 14.

The third dielectric film 14 is formed by, for example, a sputtering method, etc.

The second dielectric film 16, together with the third dielectric film 14, acts to radiate the heat generated in the recording film 15 by irradiation of a laser beam L toward the heat-radiating film 18 to be described below while physically and chemically protecting the recording film 15. The material for forming the second dielectric film 16 is not particularly limited, but the same material as the material for forming the fourth and third dielectric films 12 and 14 is used. In the present embodiment, the second dielectric film 16 contains zirconium oxide having a crystal particle diameter of 20 nm or less as a main component and has a cubic crystalline structure, similar to the fourth and third dielectric films 12 and 14, so that it can rapidly radiate the heat generated in the recording film 15 by irradiation of a laser beam L.

The second dielectric film 16 is preferably formed to have a thickness of 3 nm to 15 nm. When the thickness of the second dielectric film 16 is less than 3 nm, an effect of radiating heat is degraded, and when the thickness exceeds 15 nm, an internal stress occurring when the second dielectric film 16 is formed increases, so that cracks are apt to be caused in the second dielectric film 16.

The second dielectric film 16 is formed by, for example, a sputtering method, etc.

The first dielectric film 17 has a function of enhancing an adhesion property between the second dielectric film 16 and the heat-radiating film 18. The material for forming the first dielectric film 17 is not particularly limited as long as it has a high transmittance to a laser beam L and has high adhesion property between the second dielectric film 16 and the heat-radiating film 18. However, the first dielectric film 17 is preferably formed of a mixture of ZnS and $SiO_2$. When the first dielectric film 17 is formed of a mixture of ZnS and $SiO_2$, a molar ratio of ZnS and $SiO_2$ is preferably 60:40 to 95:5. When the molar ratio of ZnS is less than 60%, the refractive index of the first dielectric film 17 is degraded, so that a difference in reflectance between a region of the recording film 15 formed with the recording marks and a region of the recording film without the recording marks may decrease. Alternatively, when the molar ratio of ZnS exceeds 95%, it is difficult to form the first dielectric film 17 as a completely transparent film, so that disadvantages such as a degraded signal output may occur.

The first dielectric film 17 is preferably formed to have a thickness of 5 nm to 50 nm. When the thickness of the first dielectric film 17 is less than 5 nm, cracks are apt to be caused in the heat-radiating film 18, whereas when the thickness exceeds 50 nm, an effect of radiating heat may be degraded.

The first dielectric film 17 is formed by, for example, a sputtering method, etc.

The heat-radiating film 18 acts to radiate the heat transferred from the recording film 15 via the first dielectric film 17. The material for forming the heat-radiating film 18 is not particularly limited as long as it has a high optical transparency to a laser beam L and can radiate the heat generated in the recording film 15. However, materials having a thermal conductivity higher than thermal conductivity of the first dielectric film 17, for example, and AlN, $Al_2O_3$, SiN, ZnS, ZnO, $SiO_2$ SO forth are preferably employed.

The heat-radiating film 18 is preferably formed to have a thickness of 20 nm to 70 nm. When the thickness of the heat-radiating film 18 is less than 20 nm, an effect of sufficiently radiating heat may not be obtained, whereas when the thickness exceeds 70 nm, a long time is required to form the heat-radiating film 18. Therefore, the productivity may be degraded.

The heat-radiating film 18 is formed by, for example, a sputtering method, etc.

As shown in FIG. 2, the light-transmitting layer 19 is formed on a surface of the heat-radiating film 18.

The material for forming the light-transmitting layer 19 is not particularly limited as long as it is optically transparent and has a low optical absorption or reflectance in a wavelength of 380 nm to 450 nm which is a wavelength range of a laser beam L and has a low birefringence, and resin compositions containing ultraviolet (UV) curable resins, electron-beam curable resins, and so forth is preferably employed, and resin compositions containing the UV curable resin is more preferably employed.

The light-transmitting layer 19 is preferably formed to have a thickness of 30 μm to 200 μm.

The light-transmitting layer 19 is preferably formed by applying a solution of resin composition on a surface of the heat-radiating film 18 by a spin coating method. However, it may also be formed by applying a sheet formed of a light transmissive resin on a surface of the heat-radiating film 18 with an adhesive.

When data are recorded in the recording film 15 included in the information layer 20 of the optical recording medium 10 according to the present embodiment constructed as described above, and the data recorded in the recording film 15 are directly overwritten with new data, a laser beam L having its power modulated is focused on the recording film 15 via the light-transmitting layer 19 between the recording power Pw, the erasing power Pe, and the base power Pb.

In order to record data with a high recording density in the recording film 15 of the optical recording medium 10, it is preferable to focus a laser beam L having a wavelength of 380 nm to 450 nm on the recording film 15 of the optical recording medium 10 by means of an objective lens having a numerical aperture NA of 0.7 or more, and it is more preferable to meet λ/NA≦640 nm.

In the present embodiment, a laser beam L having a wavelength of 405 nm is configured to be focused on the recording film 15 of the optical recording medium 10 by means of an objective lens (not shown) having a numerical aperture of 0.85.

When recording marks are formed in the recording film 15 of the optical recording medium 10 to record the data, a laser beam L whose power is set to the recording power Pw is irradiated on the recording film 15 via the light-transmitting layer 19 while the optical recording medium 10 is rotated, and a region of the recording film 15 where the laser beam L is irradiated is heated and melted to a temperature higher than the melting point of a phase change material. Subsequently, a laser beam L whose power is set to the base power Pb is irradiated on the recording film 15 via the light-transmitting layer 19, and the region of the melt recording film 15 is rapidly cooled down, so that the phase change material is changed from its crystalline state to an amorphous state.

By doing so, the recording marks are formed in the recording film 15 to record the data.

Alternatively, when the recording marks formed in the recording film 15 are erased, a laser beam L whose power is set to the erasing power Pe is irradiated on the region where the recording marks of the recording film 15 are formed via the light-transmitting layer 19, and the region of the recording film 15 where the laser beam L is irradiated is heated to a temperature higher than the crystallizing temperature of a phase change material. Subsequently, the laser beam L is moved away from the heated region of the recording film 15, and the region of the recording film 15 heated to a temperature higher than the crystallizing temperature of a phase change material is slowly cooled down.

As a result, the phase change material is crystallized, and the recording marks formed in the region of the recording film 15 where the laser beam L is irradiated are erased.

In the meantime, when the data recorded in the recording film 15 of the optical recording medium 10 are reproduced, a laser beam L whose power is set to the reproducing power Pr is irradiated on the recording film 15 of the optical recording medium 10 via the light-transmitting layer 19 while the optical recording medium 10 is rotated.

By doing so, the laser beam L focused on the recording film 15 of the optical recording medium 10 is reflected by the recording film 15 and the reflective film 13, and the amount of the laser beam L reflected by the recording film 15 and the reflective film 13 is detected.

Since the phase change material contained in the recording film 15 has a reflectance in a crystalline state different from a reflectance in an amorphous state, a difference between the reflectances can be used to reproduce the date recorded in the recording film 15.

Hereinafter, another embodiment of the present invention will be described in detail with reference to the accompanying drawings. This embodiment corresponds to a case where the recording film of the information layer of the above-described embodiment is applied to an optical recording medium having a plurality of information layers. That is, the recording film is formed of a phase change material which contains Sb and Ge as main components and does not contain the elements in the sixteenth group of the periodic table is used as an information layer other than the information layer farthest from a light incident plane of a laser beam among the plurality of information layers.

Figure 7:
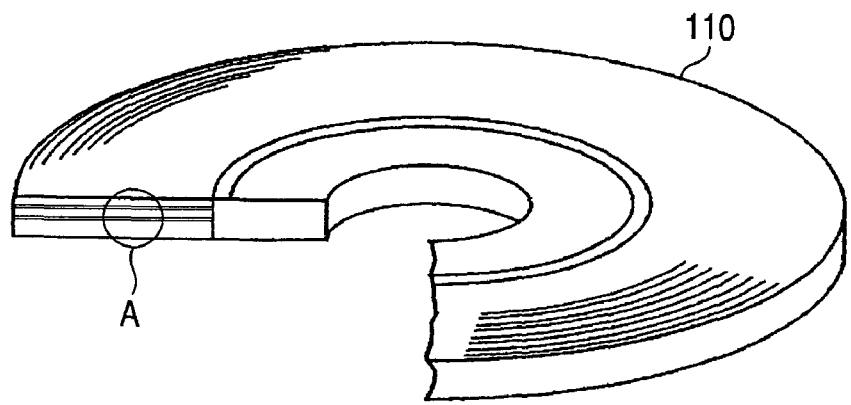
FIG. 7 is a partially cutaway schematic perspective view showing an optical recording medium in accordance with a preferred embodiment of the present invention.
Figure 8:
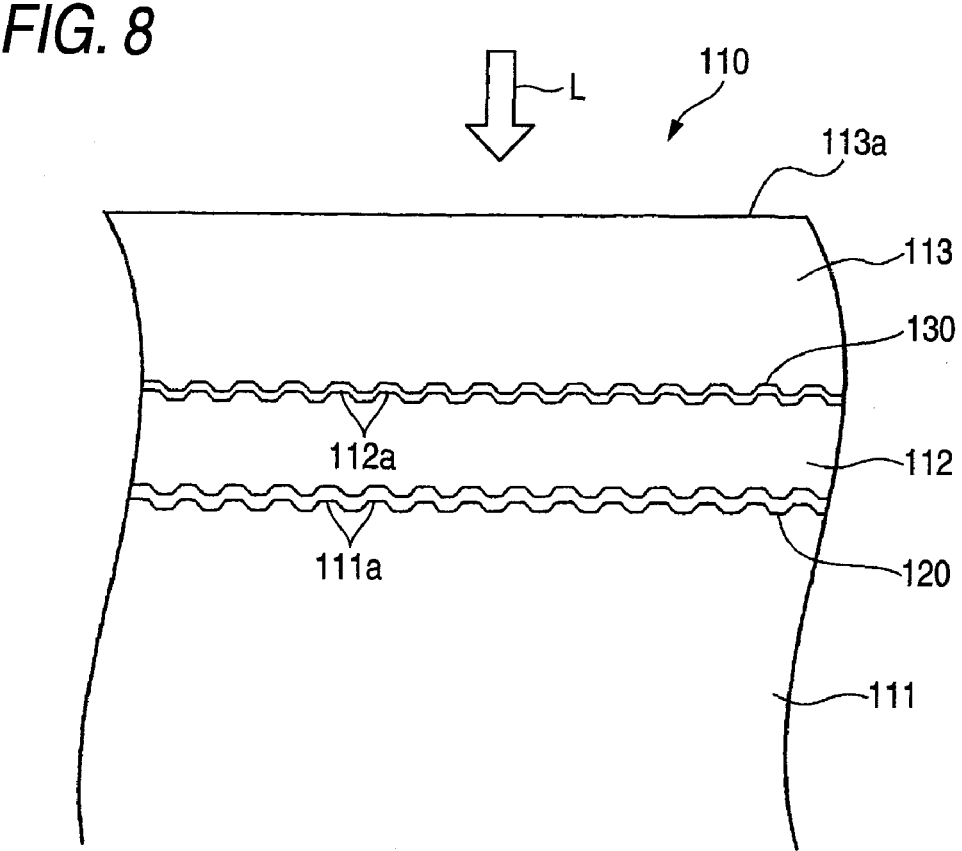
FIG. 8 is a schematically enlarged sectional view of a portion denoted by A in FIG. 7.

FIG. 7 is a partially cutaway schematic perspective view showing an optical recording medium in accordance with a preferred embodiment of the present invention, and FIG. 8 is a schematically enlarged sectional view of a portion denoted by A in FIG. 7.

As shown in FIG. 7, an optical recording medium 110 according to the present embodiment is formed in a disk shape, and has an outer diameter of about 120 mm and a thickness of about 1.2 mm.

The optical recording medium 110 of the present embodiment is configured as a rewritable optical recording medium, which includes a supporting substrate 111, a transparent intermediate layer 112, a light-transmitting layer 113, an L0 information layer 120 disposed between the supporting substrate 111 and the transparent intermediate layer 112, and an L1 information layer 130 disposed between the transparent intermediate layer 112 and the light-transmitting layer 113 as shown in FIG. 8, and one surface of the light-transmitting layer 113 forms a light incident plane 113a on which a laser beam L is incident.

In the present embodiment, the L0 information layer 120 constitutes an information layer far from the light incident plane 113a, and the L1 information layer 130 constitutes an information layer close to the light incident plane 113a.

Grooves 111a are formed on a surface of the supporting substrate 111 as shown in FIG. 8. The grooves 111a act as guide tracks for a laser beam L when data recorded in the L0 information layer 120 and are reproduced from the L0 information layer 120.

The supporting substrate 11 having the grooves 111a on its surface is manufactured by, for example, injection molding using a stamper.

As shown in FIG. 8, grooves 112a are formed on a surface of the transparent intermediate layer 112. The grooves 112a formed on the surface of the transparent intermediate layer 112 act as guide tracks for a laser beam L when data is recorded in the L1 information layer 130 and data is reproduced from the L1 information layer 130.

Figure 9:
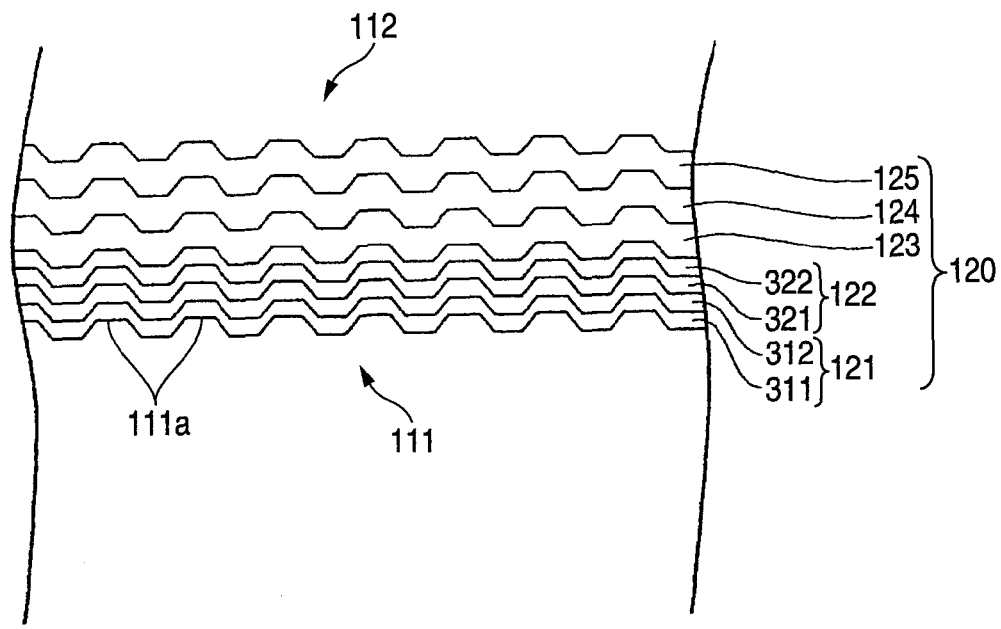
FIG. 9 is a schematically enlarged sectional view of the L0 information layer 130 as shown in FIG. 8.

FIG. 9 is a schematically enlarged sectional view of the L0 information layer 120.

As shown in FIG. 9, in the present embodiment, the L0 information layer 120 is configured such that the reflective film 121, the sixth dielectric film 122, the L0 recording film 123, the fifth dielectric film 124, and the heat-radiating film 125 are laminated from the supporting substrate 111.

The reflective film 121 is configured such that a first film 311 and a second film 322 formed of a metal material containing Ag are laminated.

The sixth dielectric film 122 is configured such that a first film 321 formed of oxides of Ce and AL and the second film 312 formed of oxides of Zn and Si are laminated, and the fifth dielectric film 124 is formed of a single film.

The L0 recording film 123 is a layer for forming recording marks, and is formed of a phase change material, and is composed of a single film. Since the phase change material has a reflectance in its crystalline state different from a reflectance in its amorphous state, the difference is employed to make data recorded and make recorded data reproduced.

The phase change material for forming the L0 recording film 123 is not particularly limited, but the L0 recording film 123 is preferably formed of a phase change material containing at least one kind of element selected from a group consisting of Sb, Te, Ge, Ag, Tb, and Mn. The thickness of the L0 recording film 23 is not particularly limited. However, 8 nm to 25 nm is preferable.

Figure 10:
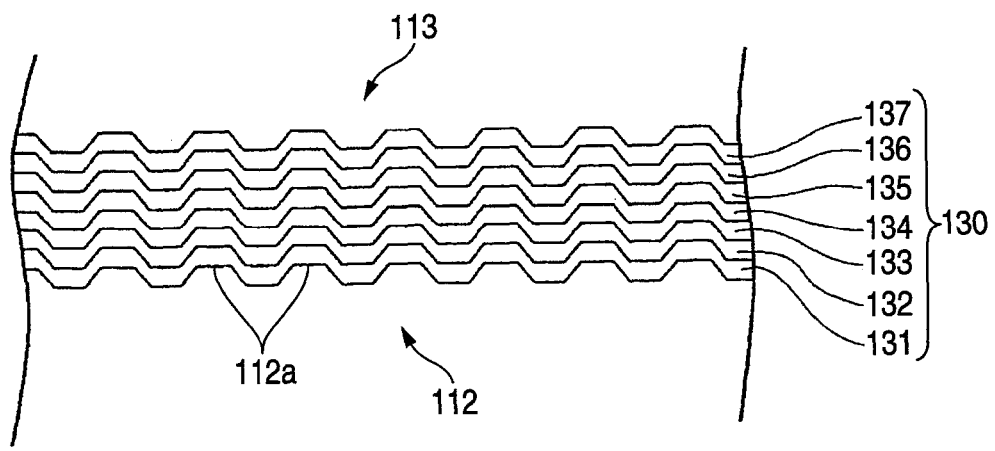
FIG. 10 is a schematically enlarged cross-sectional view of the L1 information layer 130 as shown in FIG. 8.

FIG. 10 is a schematically enlarged cross-sectional view of the L1 information layer 130.

As shown in FIG. 10, the L1 information layer 130 is configured such that a fourth dielectric film 131, a reflective film 132, a third dielectric film 133, an L1 recording film 134, a second dielectric film 135, a first dielectric film 137, and a heat-radiating film 136 are laminated from the supporting substrate 111.

The L1 recording film 134 is a layer for forming recording marks, and is formed of a phase change material, and is composed of a single film. Since the phase change material has a reflectance in its crystalline state different from a reflectance in its amorphous state, the difference is employed to make data recorded and make recorded data reproduced.

In the present embodiment, the L1 recording film 134 is formed of a phase change material which contains Sb of 79 atomic % to 95 atomic % and Ge of 5 atomic % to 21 atomic % as main components and does not contain the elements in the sixteenth group of the periodic table. When the L1 recording film 134 is formed of the phase change material, the recording marks formed in the L1 recording film 134 can be rapidly and surely erased when the data in the L1 recording film 134 included in the L1 information layer 130 of the optical recording medium 110 is directly overwritten with new data for the first time after the data is kept at a high temperature for a long time. Therefore, the jitter of reproduction signals can be prevented from being degraded when the already recorded data is directly overwritten with new data to reproduce the recorded new data. As a result, the data recorded in the L1 recording film 134 included in the L1 information layer 130 of the optical recording medium can be directly overwritten with new data as desired even when the data is kept at a high temperature for a long time.

The L1 recording film 134 is preferably formed of a phase change material which contains Sb of 81 atomic % to 90 atomic % and Ge of 10 atomic % to 19 atomic % as main components and does not contain the elements in the sixteenth group of the periodic table. In this case, the jitter of reproduction signals can be more effectively prevented from being degraded when the data recorded in the L1 recording film 134 included in the L1 information layer 130 of the optical recording medium 110 is directly overwritten with new data to reproduce the recorded new data in a case where the already recorded data is directly overwritten with the new data for the first time after the data is kept at a high temperature for a long time.

In the present embodiment, the phase change material preferably contains Sb of 79 atomic % to 95 atomic % and Ge of 5 atomic % to 21 atomic % as main components and does not contain the elements in the sixteenth group of the periodic table and has an activation energy Ea of 4.0 eV to 6.5 eV, and more preferably has an activation energy Ea of 4.0 eV to 5.5 eV. When the L1 recording film 134 is formed of such a phase change material, the data recorded in the L1 recording film 134 included in the information layer 130 of the optical recording medium 110 can be directly overwritten with new data as desired while the storage reliability of the optical recording medium 110 can be enhanced even when the data are kept at a high temperature for a long time.

Elements other than Sb, Ge, and the elements in the sixteenth group of the periodic table may be further added to the phase change material for forming the L1 recording film 134.

In the present embodiment, when the L1 recording film 134 is formed of a phase change material which contains Sb of 79 atomic % to 95 atomic % and Ge of 5 atomic % to 21 atomic % as main components and does not contain the elements in the sixteenth group of the periodic table and has an activation energy of 4.0 eV to 6.5 eV, it is possible to effectively prevent the jitter of reproduction signals from being degraded when the already recorded data is directly overwritten with new data to reproduce the recorded new data regardless of the thickness of the L1 recording film 134. However, when the thickness of the L1 recording film 134 is 2 nm to 15 nm, in particular, when the thickness of the L1 recording film 134 is 4 run to 9 nm, it is possible to more surely prevent the jitter of reproduction signals from being degraded when the already recorded data is directly overwritten with new data to reproduce the recorded new data. Accordingly, in the present embodiment, the L1 recording film 134 is formed to have a thickness of 2 run to 15 nm, and more preferably a thickness of 4 nm to 9 nm.

Accordingly, in the present embodiment, since the jitter of reproduction signals can be surely prevented from being degraded while the L1 recording film 134 can be formed thin, the information layer including the L1 recording film 134 has a high transmittance to a laser beam L having a wavelength of 380 nm to 450 nm. Accordingly, in the optical recording medium 110 of the present embodiment, a laser beam L can be irradiated on the L0 recording film 123 included in the L0 information layer 120 via the L1 information layer 130 positioned close to the light incident plane 113a, and the data can be recorded in the L0 recording film 123 included in the L0 information layer 120, and the data recorded in the L0 recording film 123 included in the L0 information layer 120 can be reproduced as desired.

When data are recorded in the L0 recording film 123 included in the information layer 120 or the L1 recording film 134 included in the L1 information layer 130 in the optical recording medium 110 according to the present embodiment constructed as above, and when the data recorded in the L0 recording film 123 included in the L0 information layer 120 or the L1 recording film 134 included in the L1 information layer 130 are directly overwritten, a laser beam L having its power modulated is focused on the L0 recording film 123 included in the L0 information layer 120 or the L1 recording film 134 included in the L1 information layer 130 via the light-transmitting layer 113 between the recording power Pw, the erasing power Pe, and the base power Pb.

In order to record data with a high recording density in the L0 recording film 123 included in the L0 information layer 120 or the L1 recording film 134 included in the L1 information layer 130 in the optical recording medium 110, it is preferable to focus a laser beam L having a wavelength of 380 nm to 450 nm on the L0 recording film 123 included in the L0 information layer 120 or the L1 recording film 134 included in the L1 information layer 130 by means of an objective lens having a numerical aperture of 0.7 or more, and it is more preferable to meet $\lambda/NA \leq 640$ nm.

In the present embodiment, a laser beam L having the wavelength of 405 nm is configured to be focused on the L0 recording film 123 included in the L0 information layer 120 or the L1 recording film 134 included in the L1 information layer 130 by means of an objective lens (not shown) having a numerical aperture of 0.85.

When recording marks are formed in the L1 recording film 134 included in the L1 information layer 130 of the optical recording medium 110 to record the data, a laser beam L whose power is set to the recording power Pw is irradiated on the L1 recording film 134 of the L1 information layer 130 via the light-transmitting layer 113 while the optical recording medium 110 is rotated, and a region of the recording film where the laser beam L is irradiated is heated and melted to a temperature higher than the melting point of the phase change material. Subsequently, a laser beam L whose power is set to the base power Pb is irradiated on the L1 recording film 134 via the light-transmitting layer 113, and the region of the melted L1 recording film 134 is rapidly cooled down, so that the phase change material is changed from its crystalline state to an amorphous state.

By doing so, the recording marks are formed in the L1 recording film 134 of the L1 information layer 130, so that the data are recorded.

On the other hand, when the recording marks formed in the L1 recording film 134 included in the L1 information layer 130 of the optical recording medium 110 are erased, a laser beam L whose power is set to the erasing power Pe is irradiated on the region where the recording marks of the L1 recording film 134 included in the L1 information layer 130 are formed via the light-transmitting layer 113, and the region of the L1 recording film 134 where the laser beam L is irradiated is heated to a temperature higher than the crystallizing temperature of a phase change material. Subsequently, the laser beam L is moved away from the heated region of the L1 recording film 134, and the region of the L1 recording film 134 heated to a temperature higher than the crystallizing temperature of a phase change material is slowly cooled down.

As a result, the phase change material is crystallized, and the recording marks formed in the region of the L1 recording film 134 where the laser beam L is irradiated are erased.

In the present embodiment, when the L1 recording film 134 of the L1 information layer 130 is formed of a phase change material which contains Sb of 79 atomic % to 95 atomic % and Ge of 5 atomic % to 21 atomic % as main components and does not contain the elements in the sixteenth group of the periodic table and has an activation energy Ea of 4.0 eV to 6.5 eV, and when the recording film is formed of the phase change material, the recording marks formed in the L1 recording film 134 can be rapidly and surely erased when the data is directly overwritten with new data for the first time after the optical recording medium 110 in which the recording marks are formed in the L1 recording film 134 included in the L1 information layer 130 to record data is kept at a high temperature for a long time even when the data recorded in the L1 recording film 134 are formed thin to have a thickness of 2 nm to 15 nm. Therefore, the jitter of reproduction signals can be prevented from being degraded when the already recorded data are directly overwritten with the new data to reproduce the recorded new data while the storage reliability of the optical recording medium 110 can be enhanced.

On the contrary, when recording marks are formed in the L0 recording film 123 included in the L0 information layer 120 of the optical recording medium 110 to record data, a laser beam L whose power is set to the recording power Pw is irradiated on the L0 recording film 123 included in the L0 information layer 120 via the light-transmitting layer 113 and the L1 information layer 130 while the optical recording medium 110 is rotated, and a region of the L0 recording film 123 where the laser beam L is irradiated is heated and melted to a temperature higher than the melting point of a phase change material. Subsequently, a laser beam L whose power is set to the base power Pb is irradiated on the L0 recording film 123 of the L0 information layer 120 via the light-transmitting layer 113 and the L1 information layer 130, and the region of the melted L0 recording film 123 is rapidly cooled down, so that the phase change material is changed from its crystalline state to an amorphous state.

By doing so, recording marks are formed in the L0 recording film 123 of the L0 information layer 120, so that data are recorded.

In the present embodiment, when the data is recorded in the L0 recording film 123 of the L0 information layer 120, the laser beam L is irradiated on the L0 recording film 123 of the L0 information layer 120 via the L1 information layer 130. However, when the L1 recording film 134 of the L1 information layer 130 is formed of a phase change material which contains Sb of 79 atomic % to 95 atomic % and Ge of 5 atomic % to 21 atomic % and does not contain the elements in the sixteenth group of the periodic table and has an activation energy of 4.0 eV to 6.5 eV, and when the recording film is formed of such a phase change material, the data recorded in the L1 recording film 134 included in the L1 information layer 130 of the optical recording medium 110 can be directly overwritten with new data as desired when the data is kept at a high temperature for a long time even when the L1 recording film 134 is formed thin to a thickness of 2 nm to 15 nm. As a result, the L1 recording film 134 can be made thin, and the second dielectric film 135, the third dielectric film 133, and the fourth dielectric film 131 of the L1 information layer 130 contain zirconium oxide having a crystal particle diameter of 20 nm or less as a main component and has a cubic crystalline structure, and the second dielectric film 135, the third dielectric film 133, and the fourth dielectric film 131 of the L1 information layer 130 have a high thermal conductivity. Thus, the reflective film 132 of the L1 information layer 130 can be formed thin. Accordingly, the L1 information layer 130 is allowed to be formed thin to increase a transmittance of the L1 information layer 130 to the laser beam L, so that a decrease in the amount of a laser beam L can be suppressed to the minimum level when the laser beam L transmits the L1 information layer 130, and the data can be recorded in the L0 recording film 123 of the L0 information layer 120 as desired.

On the other hand, when the recording marks formed in the L0 recording film 123 included in the L0 information layer 120 of the optical recording medium 110 are erased, a laser beam L whose power is set to the erasing power Pe is irradiated on the region where the recording marks of the L0 recording film 123 included in the L0 information layer 120 are formed via the light-transmitting layer 113 and the L1 information layer 130, and the region of the L0 recording film 123 where the laser beam L is irradiated is heated to a temperature higher than the crystallizing temperature of a phase change material. Subsequently, the laser beam L is moved away from the heated region of the L0 recording film 123, and the region of the L0 recording film 123 heated to a temperature higher than the crystallizing temperature of a phase change material is slowly cooled down.

As a result, the phase change material is crystallized, and the recording marks formed in the region of the L0 recording film 123 where the laser beam L is irradiated are erased.

EXAMPLES

Hereinafter, examples will be described for clarity of effects of the present invention.

Example 1

An optical recording medium sample #1 was fabricated in the following manner.

First, a polycarbonate substrate, which has a thickness of 1.1 mm, a diameter of 120 mm, and grooves formed at groove pitches of 0.32 μm on its surface, was fabricated by injection molding.

Subsequently, the polycarbonate substrate was set in a sputtering apparatus, and a fourth dielectric film containing zirconium oxide as a main component and having a thickness of 5 nm, a reflective film containing an alloy consisting of Ag of 98 atomic %, Pd of 1 atomic %, and Cu of 1 atomic % and having a thickness of 10 nm, a third dielectric film containing zirconium oxide as a main component and having a thickness of 4 nm, a recording film containing a phase change material consisting of Sb of 84 atomic % and Ge of 16 atomic % and having a thickness of 7 nm, a second dielectric film containing zirconium oxide as a main component and having a thickness of 5 nm, a first dielectric film containing a mixture of ZnS and $SiO_2$ having a molar ratio of 80:20 as main components and having a thickness of 10 nm, and a heat-radiating film containing aluminum nitride as a main component and having a thickness of 50 nm were sequentially formed on a surface formed with the grooves by a sputtering method.

In this case, the second dielectric film, the third dielectric film, and the fourth dielectric film were formed by the sputtering method using a $ZrO_2$ target in an argon gas atmosphere.

A crystalline structure and a cubic particle diameter of each of the formed second dielectric film, the third dielectric film, and the fourth dielectric film were analyzed and measured using ATX-G (product name) as an X-ray diffraction apparatus made by Rigaku Corporation. As a result, all of the second dielectric film, the third dielectric film, and the fourth dielectric film contained zirconium oxide having a crystal particle diameter of 20 nm or less as the main component and had a cubic crystalline structure.

In addition, the reflective film was formed by the sputtering method which uses an alloy target consisting of Ag of 98 atomic %, Pd of 1 atomic %, and Cu of 1 atomic % in an argon gas atmosphere.

The recording film was formed by the sputtering method using an SbGe alloy target in an argon gas atmosphere.

The first dielectric film was formed by the sputtering method which uses a mixture containing a target of ZnS and $SiO_2$ having a molar ratio of 80:20 as main components.

The heat-radiating film was formed by the sputtering method using an Al target in argon and nitrogen gas atmosphere.

Subsequently, a UV curable acrylic resin was coated on a surface of the AlN heat-radiating film by a spin coating method to form a coated film, and UV rays are irradiated on the coated film to cure the UV curable acrylic resin, thereby forming a light-transmitting layer having the thickness of 100 μm.

Subsequently, an initialization treatment was carried out on the optical recording medium with an output of 500 mW by using a semiconductor laser having a wavelength of 810 nm, and the recording film was crystallized.

By doing so, the optical recording medium sample #1 was fabricated.

Subsequently, an optical recording medium sample #2 was fabricated as was done in the optical recording medium sample #1 except that the recording film was formed to have a thickness of 7 nm and contained a phase change material consisting of Sb of 89.5 atomic % and Ge of 10.5 atomic %.

In addition, a comparative optical recording medium sample #1 was fabricated as was done in the optical recording medium sample #1 except that the recording film was formed to have a thickness of 7 nm and contained a phase change material consisting in of 0.8 atomic %, Sb of 71.1 atomic %, Ge of 5.5 atomic %, and Mn of 6.2 atomic %.

Subsequently, a comparative optical recording medium sample #2 was fabricated as was done in the optical recording medium sample #1 except that the recording film was formed to have a thickness of 7 nm and contained a phase change material consisting of Sb of 77.8 atomic % and Ge of 22.2 atomic %.

In addition, a comparative optical recording medium sample #3 was fabricated as was done in the optical recording medium sample #1 except that the recording film was formed to have a thickness of 7 nm and contained a phase change material consisting of Sb of 100 atomic %.

Subsequently, each sample was set on DDU1000 (product name) as an apparatus for evaluating the optical recording medium made by Pulstec Industrial Co., Ltd. Then, the sample was rotated at a linear velocity of 10.5 m/sec, while a laser beam having a channel clock frequency of 132 MHz, a channel bit length of 0.12 μm/bit, a wavelength of 405 nm, and having its power modulated in response to a predetermined pattern between the recording power Pw and the base power Pb was irradiated on the recording film via the light-transmitting layer by means of an objective lens having a numerical aperture of 0.85, and recording marks having a length of 2T to 8T in the 1,7RLL modulation method were randomly combined to record random signals.

In this case, when recording marks were formed in the optical recording medium sample #1, the recording power Pw of a laser beam L was set to 10.2 mW and the erasing power Pe to 3.8 mW. When recording marks were formed in the optical recording medium sample #2, the recording power Pw of a laser beam L was set to 10.2 mW and the erasing power Pe to 3.4 mW. When recording marks were formed in the comparative optical recording medium sample #1, the recording power Pw of a laser beam L was set to 10.5 mW and the erasing power Pe to 3.8 mW. When recording marks were formed in the comparative optical recording medium sample #2, the recording power Pw of a laser beam L was set to 9.5 mW and the erasing power Pe to 6.0 mW. When recording marks were formed in the comparative optical recording medium sample #3, the recording power Pw of a laser beam L was set to 10.0 mW and the erasing power Pe to 3.4 mW. Furthermore, in all of the cases, the base power Pb was set to 0.3 mW and the reproduction power Pr to 0.7 mW.

However, in the comparative optical recording medium sample #3, the crystallization rate of the phase change material was so fast that it was re-crystallized after it was melted, and an amorphous region was formed in the recording film so that recording marks could not be formed.

Subsequently, except that the power was set to the erasing power shown below between the base power Pb and the recording power Pw and a laser beam modulated in response to the predetermined pattern was used, the random signals were directly overwritten with new random signals as was done at the time of recording the random signals.

In this case, when the new random signals were directly overwritten in the optical recording medium sample #1, the erasing power of a laser beam was set to 2.6 mW, and when the new random signals were directly overwritten in the optical recording medium sample #2, the erasing power of a laser beam was set to 2.2 mW, and when the new random signals were directly overwritten in the comparative optical recording medium sample #1, the erasing power of a laser beam was set to 3.0 mW. The recorded random signals could not be directly overwritten even though the erasing power Pe of a laser beam was set to any values in the comparative optical recording medium sample #2.

Subsequently, the optical recording medium samples #1 and #2 and the comparative optical recording medium sample #1 were set on the above-mentioned optical recording medium evaluating apparatus, and random signals recorded by directly overwriting the data were reproduced under the same conditions as the case of recording the random signals, and clock jitters (%) of the reproduced signals were measured, thereby evaluating initial direct overwriting characteristics.

In this case, the clock jitter was calculated by a fluctuation σ of the reproduced signals and σ/Tw (Tw: one period of the clock) by a time interval analyzer. A measurement result of the optical recording medium sample #1 was shown by the curve A0 of FIG. 3, and a measurement result of the comparative optical recording medium sample #2 by the curve B0 of FIG. 4, and a measurement result of the comparative optical recording medium sample #1 by the curve C0 of FIG. 5, respectively.

In addition, the same procedure was carried out except that the erasing power Pe was sequentially changed to 5.0 Mw with each increase of 0.4 mW, so that the random signals already recorded in the optical recording medium sample #1 were directly overwritten with new random signals to reproduce the newly recorded random signals, and the clock jitter of the reproduced signal was measured. The measurement result was shown by the curve A0 of FIG. 3.

Subsequently, the same procedure was carried out except that the erasing power Pe was sequentially changed to 5.0 Mw with each increase of 0.4 mW, so that the random signals already recorded in the optical recording medium sample #2 were directly overwritten with new random signals to reproduce the newly recorded random signals, and the clock jitter of the reproduced signals were measured. The measurement result was shown by the curve B0 of FIG. 4.

In addition, the same procedure was carried out except that the erasing power Pe was sequentially changed to 5.0 Mw with each increase of 0.4 mW, so that the random signals already recorded in the comparative optical recording medium sample #1 were directly overwritten with new random signals to reproduce the newly recorded random signals, and the clock jitter of the reproduced signals were measured. The measurement result was shown by the curve C0 of FIG. 5.

In addition, each sample was stripped in an interface between the third dielectric film and the recording film or between the second dielectric film and the recording film so as to make exposed surfaces of the recording films of the optical recording medium samples #1 and #2 and the comparative optical recording medium samples #1 to #3. Each sample was then set on an ATX-G (product name) as an X-ray diffraction apparatus for evaluating a thin film made by Rigaku Corporation, and Cu-Kα rays were irradiated on the recording film to measure the X-ray diffraction.

Figure 6:
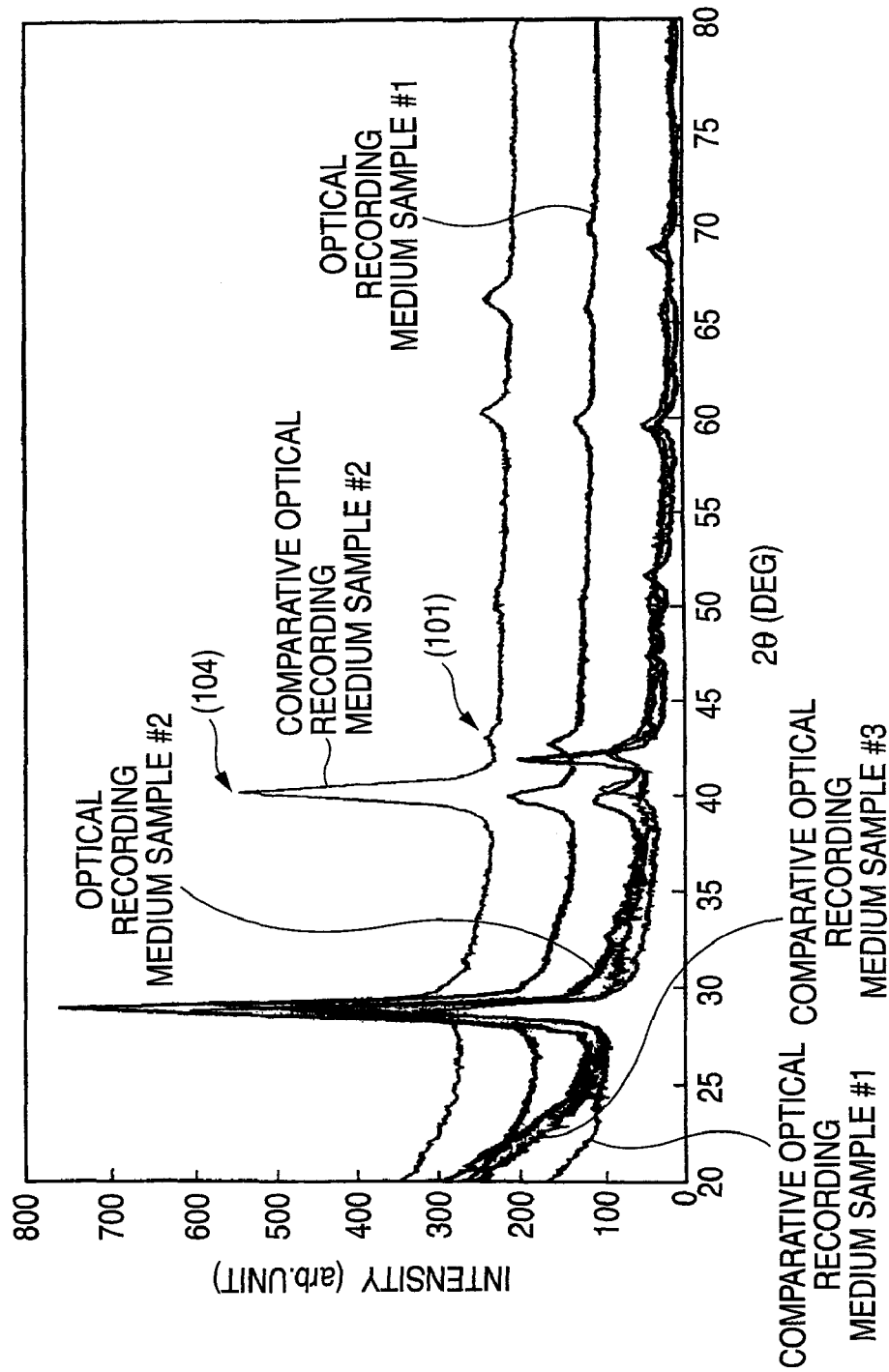
FIG. 6 is an X-ray diffraction chart illustrating a crystalline phase of a phase change material constituting a recording film of each sample.

By doing so, the obtained X ray diffraction chart is shown in FIG. 6.

An index as a hexagonal lattice was given to a diffraction ray shown in the X-ray diffraction chart obtained in the above-described manner, and a diffraction ray originating from the hexagonal surface 104 appearing near an incident angle of 2θ=39° to 41° of the X-ray diffraction chart and a diffraction ray originating from the hexagonal surface 110 appearing near an incident angle of 2θ=41° to 43° of the X-ray diffraction chart were used to obtain the "a" axis length and the "c" axis length to calculate an axis ratio (c/a).

The calculation results were shown in Table 1.

TABLE 1

|  | Optical recording medium | | Comparative optical recording medium sample | | |
|---|---|---|---|---|---|
|  | #1 | #2 | #1 | #2 | #3 |
| "a" axis length (Å) | 4.238 | 4.260 | 4.273 | 4.209 | 4.302 |
| "c" axis length (Å) | 11.464 | 11.489 | 11.333 | 11.435 | 11.479 |
| Axis ratio (c/a) | 2.705 | 2.697 | 2.653 | 2.717 | 2.668 |

In the X-ray diffraction chart shown in FIG. 6, the diffraction ray near an incident angle of 2θ=28° to 29°, the diffraction ray near an incident angle of 2θ=39° to 41°, and the diffraction ray near an incident angle of 2θ=41° to 43° were equal to Sb (012) plane, Sb (104) plane, and Sb (110) plane as characteristic diffraction rays having a rhombohedron structure and originating from an Sb phase in all of the optical recording medium samples #1 and #2 and the comparative optical recording medium samples #1 to #3, and a characteristic diffraction ray originating from the Ge phase or SbGe phase was not detected. Accordingly, when the phase change material forming the recording film of each of the optical recording medium samples #1 and #2 and the comparative optical recording medium samples #1 to #3 was crystallized, it was found that the crystalline structure was formed with a single phase of Sb, and the generated crystal was only one kind.

Example 2

As was done in Example 1, optical recording medium samples #1 and #2 and comparative optical recording medium sample #1 were fabricated in which random signals were recorded by randomly combining recording marks each having a length of 2T to 8T in the 1,7RLL modulation method, and each sample was kept for 24 hours under an environment of 80° C. and 10% RH, respectively, and a high temperature storage test was carried out.

Subsequently, each sample after the high temperature storage test was processed as was done in Example 1, and the radon signals recorded before the high temperature storage test was repeatedly directly overwritten with new random signals one time to ten times, and the newly recorded random signals were reproduced, respectively, and clock jitters (%) of the reproduced signals were measured, thereby evaluating the initial direct overwriting characteristics at the time of carrying out the direct overwriting for the first time after the high temperature storage test, and the repeated direct overwriting characteristics at the time of repeatedly performing direct overwriting after the high temperature storage test.

Figure 3:
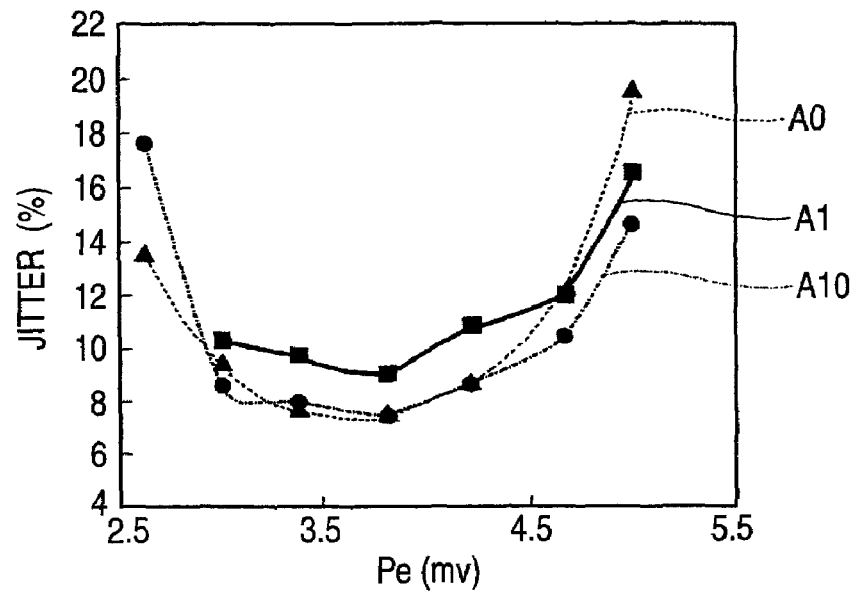
FIG. 3 are graphs illustrating initial direct overwriting characteristics, initial direct overwriting characteristics after a high temperature storage test, and repeated direct overwriting characteristics after the high temperature storage test in an optical recording medium sample #1.
Figure 4:
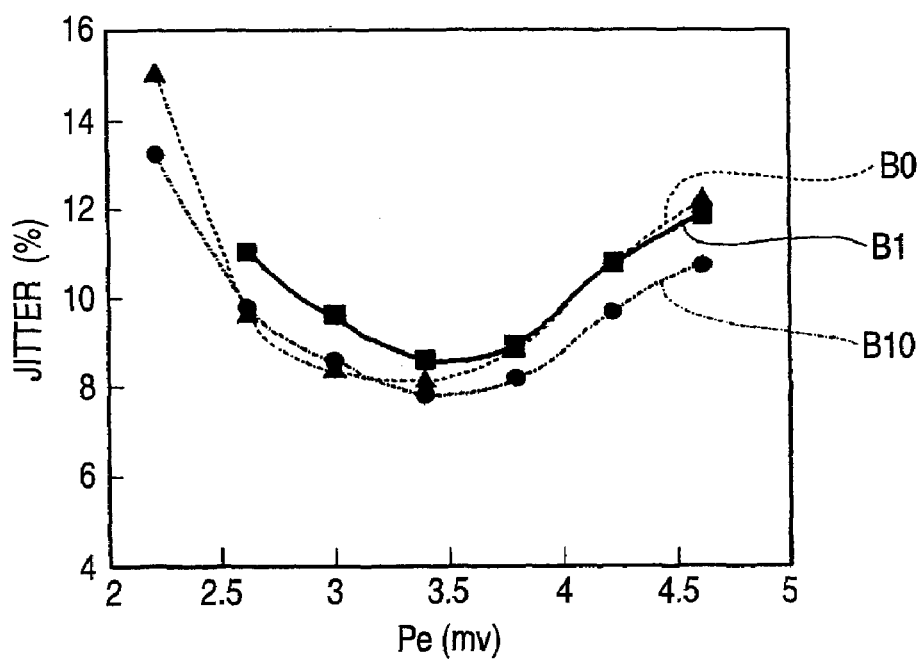
FIG. 4 are graphs illustrating initial direct overwriting characteristics, initial direct overwriting characteristics after a high temperature storage test, and repeated direct overwriting characteristics after the high temperature storage test in an optical recording medium sample #2.
Figure 5:
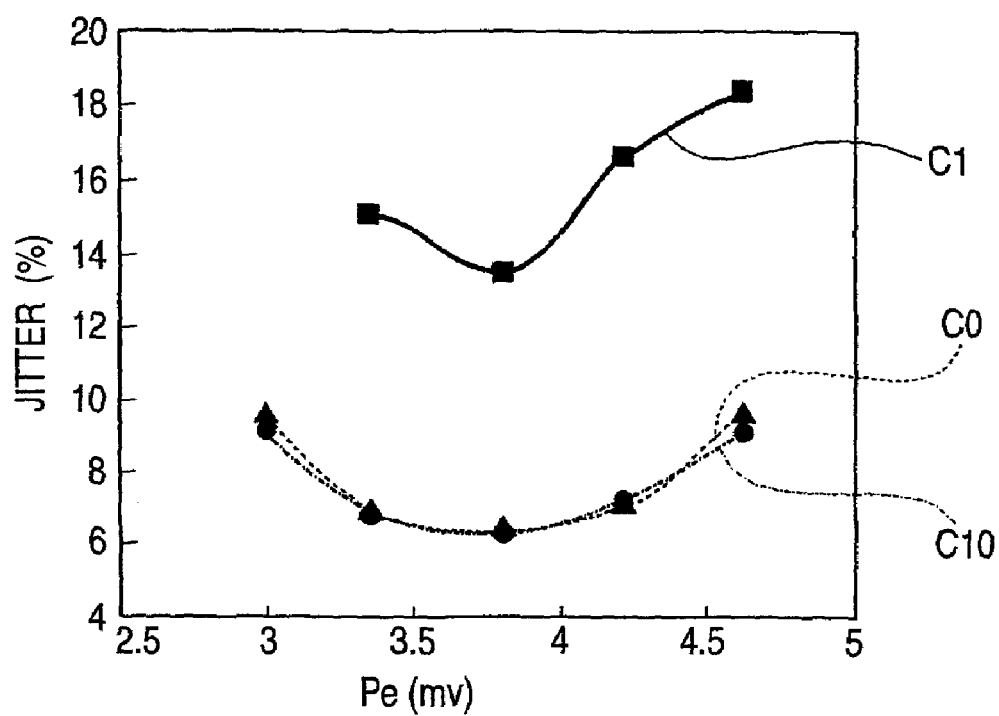
FIG. 5 are graphs illustrating initial direct overwriting characteristics, initial direct overwriting characteristics after a high temperature storage test, and repeated direct overwriting characteristics after a high temperature storage test in a comparative optical recording medium sample #1.

In the optical recording medium sample #1, the measurement result of the initial direct overwriting characteristics when the direct overwriting was done for the first time after the high temperature storage test was shown by the curve A1 of FIG. 3, the measurement result of the repeated direct overwriting characteristics when the direct overwriting was repeatedly done for the first time after the high temperature storage test was shown by the curve A10 of FIG. 3, and in the optical recording medium sample #2, the measurement result of the initial direct overwriting characteristics when the direct overwriting was done for the first time after the high temperature storage test was shown by the curve B1 of FIG. 4, the measurement result of the repeated direct overwriting characteristics when the direct overwriting was repeatedly done for the first time after the high temperature storage test was shown by the curve B10 of FIG. 4, and in the comparative optical recording medium sample #1, the measurement result of the initial direct overwriting characteristics when the direct overwriting was done for the first time after the high temperature storage test was shown by the curve C1 of FIG. 5, the measurement result of the repeated direct overwriting characteristics when the direct overwriting was repeatedly done for the first time after the high temperature storage test was shown by the curve C10 of FIG. 5.

As shown in FIGS. 3, 4, and 5, it was found that the jitter of the reproduced signals when the repeated direct overwriting characteristics after the high temperature storage test was evaluated was not significantly different from the jitter of the reproduced signals when the initial direct overwriting characteristics after the high temperature storage test was evaluated in all of the optical recording medium samples #1 and #2 and the comparative optical recording medium sample #1.

However, it was found that the jitter of the reproduced signals when the initial direct overwriting characteristics after the high temperature storage test was evaluated was not significantly degraded in the optical recording medium samples #1 and #2, but was remarkably degraded in the comparative optical recording medium sample #1.

Accordingly, it was found that the data recorded in each of the optical recording medium samples #1 and #2 were directly overwritten with new data as desired even after each sample was kept at a high temperature for a long time, whereas the data recorded in the comparative optical recording medium sample #1 could not be directly overwritten with new data when the sample was kept at a high temperature for a long time.

From Example 1 and Example 2, it was found that when an index as a hexagonal lattice is given to a crystallized crystal which contains Sb and Ge as main components and does not contain the elements in the sixteenth group of the periodic table, the data recorded in each of the optical recording medium samples #1 and #2 including an information layer having a recording film formed of a phase change material forming the crystal having an axis ratio (c/a) of 2.670 to 2.715 of the "c" axis length with respect to the "a" axis length in the hexagonal lattice can be directly overwritten with new data as desired even after each sample is kept at a high temperature for a long time, whereas the data recorded in the comparative optical recording medium sample #1 including an information layer having a recording film formed of a phase change material forming the crystal having an axis ratio (c/a) of 2.653 of the "c" axis length with respect to the "a" axis length in the hexagonal lattice could not be directly overwritten with new data when the comparative sample was kept at a high temperature for a long time.

In addition, it was found that when an index as a hexagonal lattice is given to a crystallized crystal which contains Sb and Ge as main components and does not contain the elements in the sixteenth group of the periodic table, the random signals recorded in the comparative optical recording medium samples #2 an #3 including an information layer having a recording film formed of a phase change material which does not form the crystal having an axis ratio (c/a) of 2.670 to 2.715 of the "c" axis length with respect to the "a" axis length in the hexagonal lattice could not be directly overwritten and even recording marks could not be formed in the comparative sample.

Example 3

The same processing as Example 1 was carried out except that a slide glass substrate was used instead of the polycarbonate substrate to fabricate the optical recording medium sample #1 and the comparative optical recording medium samples #1 to #3, and each sample was heated from 100° C. by a temperature rising rate of 30° C./min to observe the reflecting light by means of an optical microscope and measure the amount of reflected light when the phase change material contained in the recording film of each sample was changed from its as-depo (amorphous) state to a crystalline state, thereby measuring the crystallization temperature of each sample.

However, since the recording film is already formed of Sb, and the phase change material formed of Sb is already crystallized at 100° C. in the optical recording medium sample #3, the crystallization temperature could not be measured.

Subsequently, an activation energy Ea of the phase change material forming a recording film of each of the optical recording medium samples #1 and #2 and the comparative optical recording medium samples #1 and #2 was obtained from the crystallization temperature $T_0$ measured while changing the temperature-rising rate by the Kissinger plot method.

By doing so, the activation energy Ea of the optical recording medium sample #1 was 5.1 eV, the activation energy Ea of the comparative optical recording medium sample #2 was 3.9 eV, and the activation energy Ea of the comparative optical recording medium sample #1 was 7.2 eV.

Subsequently, each sample after the high temperature storage test as was done in Example 2 was set in the above-mentioned optical recording medium evaluating apparatus, and random signals already recorded in each sample were reproduced and clock jitters of the reproduced signals were measured in the same manner as Example 1. As a result, it was found that a value almost equal to the value of the clock jitter measured before the high temperature storage test was obtained and the maintenance reliability was high in all of the samples.

The present invention is not limited to the above embodiments and examples and various modifications can be made within the scope of the invention as set forth in the claims and it is needless to say that these modifications fall within the scope of this invention.

For example, in the above embodiments, the optical recording medium 10 is configured to have the light-transmitting layer 19 and make a laser beam L irradiated on the recording film 15 via the light-transmitting layer 19. However, the present invention is not limited to the optical recording medium having such a structure, and may be configured such that the optical recording medium has a substrate formed of a light-transmitting material and a laser beam L is irradiated on the recording film 15 via the substrate.

Furthermore, in the above embodiments, all of the second dielectric film 16, the third dielectric film 14, and the fourth dielectric film 12 included in the information layer 20 of the optical recording medium 10 contains zirconium oxide as a main component. However, all of the second dielectric film, the third dielectric film 14, and the fourth dielectric film 12 does not need to contain zirconium oxide as the main component, and at least one of the second dielectric film 16, the third dielectric film 14, and the fourth dielectric film 12 may contain zirconium oxide as the main component.

Furthermore, in the above embodiments, both of the third dielectric film 14 and the fourth dielectric film 12 included in the information layer 20 of the optical recording medium 10 is formed adjacent to the reflective film 13. However, both of the third dielectric film 14 and the fourth dielectric film 12 included in the information layer 20 of the optical recording medium 10 does not need to be formed adjacent to the reflective film 13, and another layer may be interposed between the third dielectric film 14 and the reflective film 13 and/or between the fourth dielectric film 12 and the reflective film 13 within a range of not adversely affecting the heat-radiating property of the information layer.

Furthermore, in the above embodiments, the optical recording medium 10 includes the information layer 20 having the fourth dielectric film 12, the reflective film 13, the third dielectric film 14, the recording film 15, the second dielectric film 16, the first dielectric film 17, and the heat-radiating film 18. However, the information layer 20 does not necessarily have the fourth dielectric film 12, the reflective film 13, the third dielectric film 14, the recording film 15, the second dielectric film 16, the first dielectric film 17, and the heat-radiating film 18, and the optical recording medium may include an information layer having a reflective film, a second dielectric film, a recording film, a first dielectric film, and a heat-radiating film.

Alternatively, in the above embodiments, the optical recording medium 10 includes the information layer 20 having the fourth dielectric film 12, the reflective film 13, the third dielectric film 14, the recording film 15, the second dielectric film 16, the first dielectric film 17, and the heat-radiating film 18. However, the optical recording medium 10 does not necessarily have the single information layer 20, and at least two or more information layers may be included in the optical recording medium.

The present invention has been described in detail or with reference to specific embodiments. However, it is obvious to those skilled in the art that various modifications and changes can be made to the present invention without departing from the spirit and scope of the present invention.

This application is based on Japanese Patent Application Nos. 2004-208047, 2004-208048, and 2004-208049 filed on Jul. 15, 2004 and the disclosure thereof is incorporated by reference in its entirety.

What is claimed is:

1. An optical recording medium comprising an information layer having a recording film,
    wherein the recording film is formed of a phase change material which comprises Sb of 79 atomic % to 95 atomic % and Ge of 5 atomic % to 21 atomic % as main components and does not contain the elements in the sixteenth group of the periodic table,
    wherein the phase change material has an activation energy Ea of 4.0 eV to 6.5 eV, and
    wherein the phase change material forms a crystal having an axis ratio (c/a) of 2.670 to 2.715 of the "c" axis length with respect to the "a" axis length in a hexagonal lattice when an index as a hexagonal lattice is given to the crystal generated by crystallizing the phase change material.

2. The optical recording medium according to claim 1, wherein the recording film is formed to have a thickness of 2 nm to 15 nm.

3. The optical recording medium according to claim 1, wherein the recording film comprises Sb of 81 atomic % to 90 atomic % and Ge of 10 atomic % to 19 atomic % as main components.

4. The optical recording medium according to claim 1, wherein the axis ratio (c/a) of the "c" axis length with respect to the "a" axis length in the hexagonal lattice is 2.690 to 2.715.

5. An optical recording medium, comprising:
    a plurality of information layers laminated via at least a transparent intermediate layer on a supporting substrate,
    wherein at least one of the information layers other than an information layer farthest from a light incident plane of a laser beam among the plurality of information layers includes a recording film formed of a phase change material which comprises Sb of 79 atomic % to 95 atomic % and Ge of 5 atomic % to 21 atomic % as main components and does not contain the elements in the sixteenth group of the periodic table,
    wherein the phase change material has an activation energy Ea of 4.0 eV to 6.5 eV, and
    wherein the phase change material forms a crystal having an axis ratio (c/a) of 2.670 to 2.715 of the "c" axis length with respect to the "a" axis length in a hexagonal lattice when an index as a hexagonal lattice is given to the crystal generated by crystallizing the phase change material.

6. The optical recording medium according to claim 5, wherein the recording film is formed to have a thickness of 2 nm to 15 nm.

7. The optical recording medium according to claim 5, wherein the information layer farthest from a light incident plane of a laser beam includes a recording film formed of a phase change material.

8. The optical recording medium according to claim 5, wherein the axis ratio (c/a) of the "c" axis length with respect to the "a" axis length in the hexagonal lattice is 2.690 to 2.715.

9. The optical recording medium according to claim 5, wherein the recording film comprises Sb of 81 atomic % to 90 atomic % and Ge of 10 atomic % to 19 atomic % as main components.

10. The optical recording medium according to claim 1, wherein the thickness is 4 nm to 9 nm.

11. The optical recording medium according to claim 5, wherein the thickness is 4nm to 9nm.

12. The optical recording medium according to claim 1, which additionally comprises elements other than Sb, Ge and elements in the sixteenth group of the periodic table.

13. The optical recording medium according to claim 5, which additionally comprises elements other than Sb, Ge and elements in the sixteenth group of the periodic table.

14. The optical recording medium according to claim 1, wherein the recording film comprises Sb of 84 atomic % to 89.5 atomic % and Ge of 10.5 atomic % to 16 atomic % as main components.

15. The optical recording medium according to claim 5, wherein the recording film comprises Sb of 84 atomic % to 89.5 atomic % and Ge of 10.5 atomic % to 16 atomic % as main components.

16. The optical recording medium according to claim 1, wherein the axis ratio (c/a) of the "c" axis length with respect to the "a" axis length in the hexagonal lattice is 2.697 to 2.705.

17. The optical recording medium according to claim 5, wherein the axis ratio (c/a) of the "c" axis length with respect to the "a" axis length in the hexagonal lattice is 2.697 to 2.705.

* * * * *